US012084143B2

(12) United States Patent
Bonvissuto et al.

(10) Patent No.: US 12,084,143 B2
(45) Date of Patent: *Sep. 10, 2024

(54) SECURITY ENCLOSURE FOR MOTORCYCLE SADDLEBAG

(71) Applicant: Console Vault, LLC, Powell, OH (US)

(72) Inventors: Scott Bonvissuto, Westerville, OH (US); Ian Molitors, Dublin, OH (US); Christos Ragias, Columbus, OH (US)

(73) Assignee: Console Vault, LLC, Powell, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/046,674

(22) Filed: Oct. 14, 2022

(65) Prior Publication Data
US 2023/0062708 A1 Mar. 2, 2023

Related U.S. Application Data

(63) Continuation of application No. 16/858,659, filed on Apr. 26, 2020, now Pat. No. 11,472,506.

(60) Provisional application No. 62/839,636, filed on Apr. 27, 2019.

(51) Int. Cl.
B62J 9/30 (2020.01)
B62J 9/26 (2020.01)
E05B 83/28 (2014.01)

(52) U.S. Cl.
CPC . B62J 9/30 (2020.02); B62J 9/26 (2020.02); E05B 83/28 (2013.01)

(58) Field of Classification Search
CPC ............... B62J 9/30; B62J 9/26; E05B 83/28
USPC ....................................................... 224/413
See application file for complete search history.

(56) References Cited

U.S. PATENT DOCUMENTS

| | | |
|---|---|---|
| 2,527,433 A | 10/1950 | La Rochelle |
| 4,542,839 A | 9/1985 | Evine et al. |
| 4,979,658 A | 12/1990 | Baker |
| 5,324,115 A | 6/1994 | Weinreb |
| 5,996,865 A | 12/1999 | Bissey |
| 6,533,339 B1 | 3/2003 | Bettin et al. |
| 6,766,931 B2 | 7/2004 | Wolf |
| 6,832,710 B2 | 12/2004 | Galbraith et al. |
| 7,143,913 B2 | 12/2006 | Lindsey et al. |
| 7,150,382 B2 | 12/2006 | Zickefoose |
| 7,748,746 B2 | 7/2010 | Beiber Hoeve et al. |
| 7,793,747 B2 | 9/2010 | Brown |

(Continued)

FOREIGN PATENT DOCUMENTS

WO    2010082914 A1    7/2010

Primary Examiner — Peter N Helvey
(74) Attorney, Agent, or Firm — UB Greensfelder LLP; Matthew J. Schonauer

(57) ABSTRACT

The exemplary embodiments herein provide a motorcycle saddlebag security enclosure assembly having an enclosure with a substantially flat top panel, an access door substantially parallel to the top panel, a bottom panel positioned below the top panel, and a plurality of side panels which connect between the top panel and bottom panel. Embodiments further contain a base adapted for removable attachment to the enclosure and having a substantially flat base plate, and a plurality of legs extending downwardly from the base plate. Preferably, a hook extending upwardly from the top panel and a pass-through aperture is placed on the same side of the enclosure as the hook. A C-shaped base element is placed beneath the base and near a central portion. A U-shaped channel extends below the top panel and accepts a sidewall of the access door.

20 Claims, 19 Drawing Sheets

(56) References Cited

U.S. PATENT DOCUMENTS

| | | |
|---|---|---|
| 7,926,687 B2 | 4/2011 | Kaczkowski et al. |
| 8,083,111 B2 | 12/2011 | Lase |
| 8,151,925 B2 | 4/2012 | Aramayo, II et al. |
| 8,167,181 B2 | 5/2012 | Kaczkowski et al. |
| 8,172,188 B2 | 5/2012 | Dubinskiy et al. |
| 8,272,310 B2 | 9/2012 | Ingram |
| 8,408,437 B1 | 4/2013 | Ponsaa |
| 8,608,039 B2 | 12/2013 | Kaczowski et al. |
| 8,720,757 B2 | 5/2014 | Salisbury |
| 8,925,778 B1 | 1/2015 | Gordon |
| 8,967,315 B1 | 3/2015 | Lescallett |
| 9,022,266 B1 | 5/2015 | Kleppin |
| 9,211,928 B2 | 12/2015 | Kaczowski et al. |
| 9,908,475 B2 | 3/2018 | Ayala Diaz et al. |
| 10,093,376 B2 | 10/2018 | Da Deppo et al. |
| 10,829,174 B2 | 11/2020 | Baruzzo |
| 10,829,175 B2 | 11/2020 | Budd |
| 2002/0121534 A1 | 9/2002 | Hanagan |
| 2005/0161482 A1 | 7/2005 | Krohn |
| 2005/0161483 A1 | 7/2005 | Krohn et al. |
| 2006/0231308 A1 | 10/2006 | Takahashi et al. |
| 2007/0101780 A1 | 5/2007 | Sanders |
| 2007/0235486 A1 | 10/2007 | Bernard |
| 2008/0083801 A1 | 4/2008 | Knoch et al. |
| 2008/0178642 A1 | 7/2008 | Sanders |
| 2010/0264183 A1 | 10/2010 | Kaczowski et al. |
| 2010/0264185 A1 | 10/2010 | Kaczkowski et al. |
| 2011/0192872 A1 | 8/2011 | Kaczkowski et al. |
| 2011/0315728 A1 | 12/2011 | Ghormley |
| 2012/0187168 A1 | 7/2012 | Kaczowski et al. |
| 2016/0010948 A1 | 1/2016 | Gerdes |
| 2016/0167727 A1 | 6/2016 | Da Deppo et al. |
| 2019/0084637 A1 | 3/2019 | Budd |

SECURITY ENCLOSURE FOR MOTORCYCLE SADDLEBAG

CROSS-REFERENCE TO RELATED APPLICATIONS

This application claims priority to U.S. application Ser. No. 16/858,659 filed on Apr. 26, 2020, which claims priority to U.S. Application No. 62/839,636 filed on Apr. 27, 2019, the entire contents of each of which are incorporated herein by reference.

TECHNICAL FIELD

Embodiments generally relate to devices for securing valuable personal items, which are concealed within a motorcycle saddlebag.

BACKGROUND OF THE ART

Taking valuable personal items outside of your home includes a number of risks depending on the type of valuable that is being transported. When transporting valuable items, the user's primary concern may be the theft of those items. When transporting dangerous items, the user's primary concern may be compliance with any state and federal regulations for transporting a dangerous item. In the case of firearms, these devices must be transported securely based on regulations, but in many cases are also quite valuable to the owner in a monetary sense as well.

When travelling by motorcycle, it can be particularly challenging to secure valuable or dangerous personal items as there is a severe limit on space and weight that is available. For various reasons, not only consumers but also law enforcement personnel, require a new way to securely store firearms and other items when travelling by motorcycle, that is not susceptible to theft, shock, or abuse.

SUMMARY OF THE EXEMPLARY EMBODIMENTS

Exemplary embodiments provide a secure enclosure for use within a motorcycle saddlebag, having an enclosure which is fastened to a base. The enclosure has an access door with a lock, a hook extending from the top surface of the enclosure, and a threaded fastener which extends through an aperture in the sidewall of the enclosure. Preferably, the hook is the only component which extends above the top surface of the saddlebag. A C-shaped component is placed beneath the base, along with a series of optional feet. A panel assembly is formed and welded into a front corner of the device, on the same side as the hook preferably. The base contains a number of features including legs having specific geometry relative to one another and a rounded void on an end of the base. In an exemplary embodiment, the hook should not be a pry point relative to the access door and should be designed to account for this.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

Figure 1:
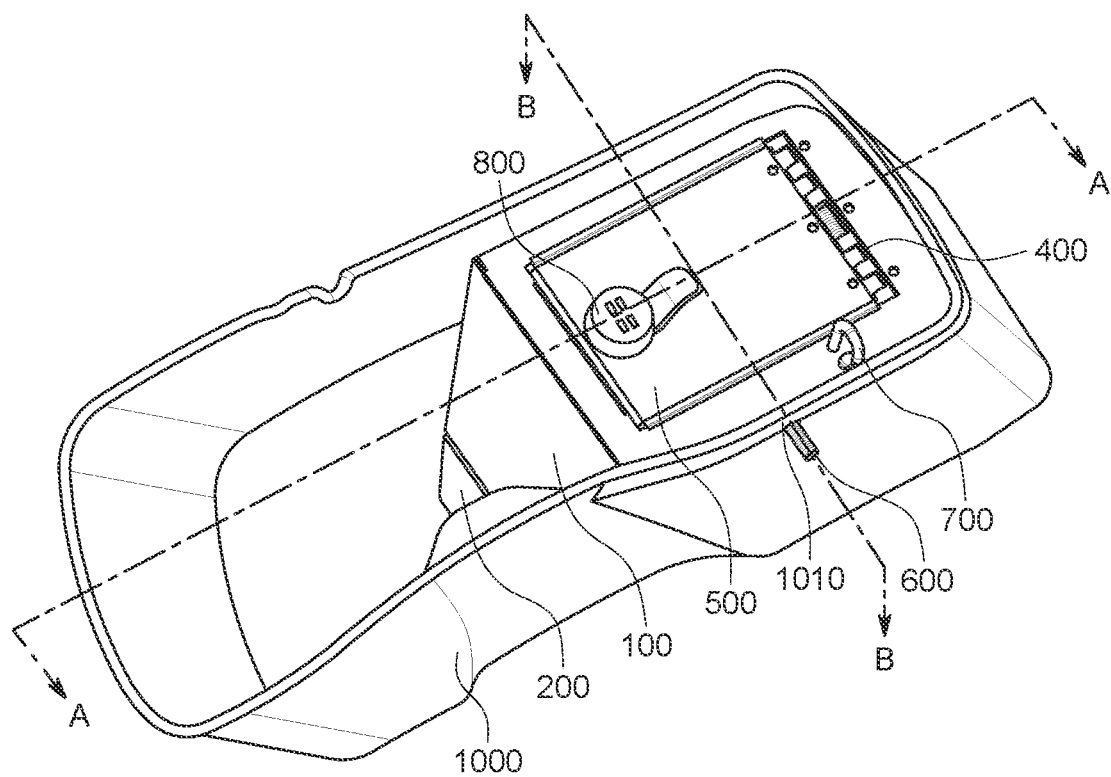
FIG. 1 is a perspective illustration of an exemplary security enclosure placed within a typical motorcycle saddlebag and indicating the section lines A-A and B-B which are shown cutting vertically through the device.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a perspective illustration of an exemplary security enclosure placed within a motorcycle saddlebag 1000 and indicating the section lines A-A and B-B which are shown cutting vertically through the device. In this embodiment, the device is essentially comprised of an enclosure 100 which is removably fastened to a base 200. The enclosure 100 preferably includes an access door 500, hingedly fastened to a top panel of the enclosure 100 using a hinge 400. A lock assembly 800 is preferably attached to the access door 500 so that it can permit a locking bar or lever 850 to rotate relative to the access door 500 to engage with slots built into the enclosure (shown further below). A latch or hook 700 is preferably attached to the top panel of the enclosure 100, but not on the access door 500 preferably. A threaded fastener 600 preferably extends through the enclosure 100 and passes through an aperture 1010 that is preferably placed on the saddlebag 1000.

Figure 2:
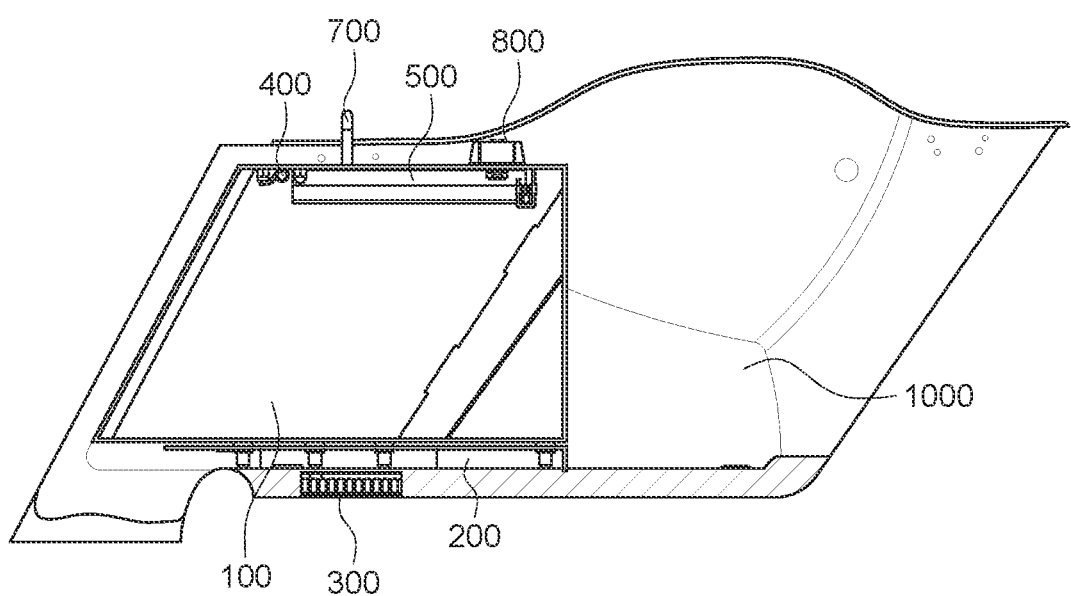
FIG. 2 is a left section view taken along the section line A-A shown in FIG. 1.

As shown, section line A-A passes generally through the center of the device, cutting vertically through the lock assembly 800. Also as shown, section line B-B is generally perpendicular to section line A-A, cutting through the central portion of the enclosure 100, specifically through the central axis of the threaded fastener 600. FIG. 2 is a left section view taken along the section line A-A shown in FIG. 1. Preferably, the latch or hook 700 extends from the top panel 101 of the enclosure 100 to a point above the top edge of the saddlebag 1000. The remaining components should preferably be located below the top edge of the saddlebag 1000. A C-shaped base element 300 is preferably placed below the base 200 and is generally located near the center of the base plate 201. The C-shaped element 300 is preferably comprised of an elastomer, preferably a rubber of some type but any soft or adequately compressible material would work in various embodiments.

Figure 3:
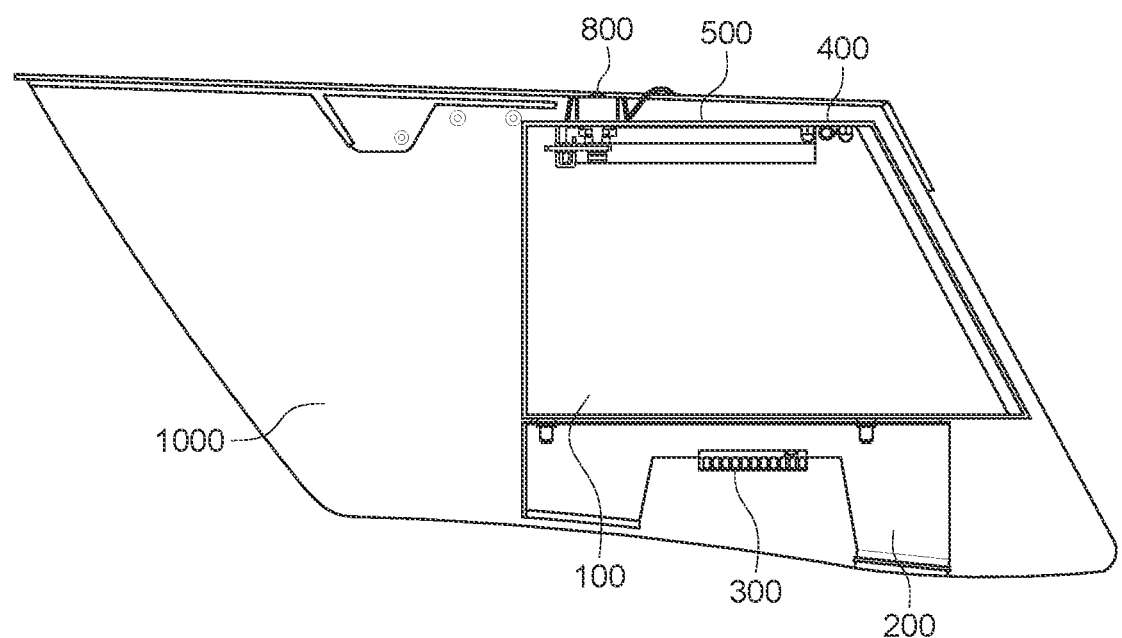
FIG. 3 is a right section view taken along the section line A-A shown in FIG. 1.

FIG. 3 is a right section view taken along the section line A-A shown in FIG. 1.

Figure 4:
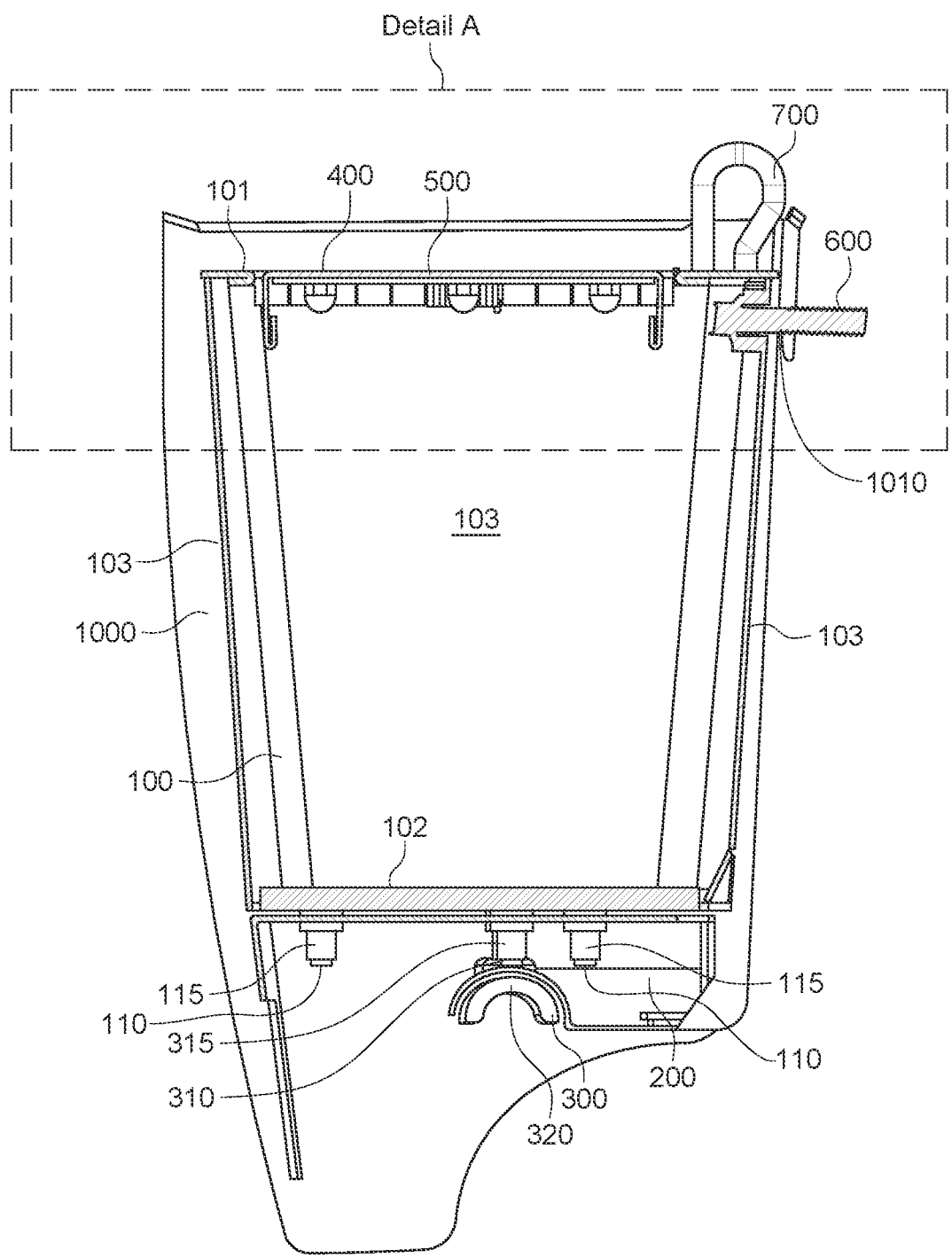
FIG. 4 is a front section view taken along the section line B-B shown in FIG. 1, and indicating the location for Detail A.

FIG. 4 is a front section view taken along the section line B-B shown in FIG. 1, and indicating the location for Detail A. The enclosure 100 is generally defined by the top panel 101 positioned above and substantially parallel to the bottom panel 102 (each being substantially flat). A plurality of side panels 103 extend upwardly from the bottom panel 102 to connect with the top panel 101. The enclosure 100 is preferably removably fastened to the base 200 by threaded fasteners 110 which pass downward through the floor of the enclosure 100 to engage with female threaded members 115, which effectively squeeze the base 200 and enclosure 100 together. The female threaded members 115 are preferably attached to the base 200, ideally by welding the members 115 to the base 200, but adhesive or other attachment methods could be used. The C-shaped element 300 is preferably fastened to the base 200 by one or more fasteners 310 which pass upwardly through an aperture 320 in the C-shaped element 300, in order to engage with a female threaded member 315. The female threaded members 315 are preferably attached to the base 200, in some embodiments using the same methods as female threaded members 115. The term "C-shaped" is used herein to represent a general C-shaped cross-section of the element 300. As shown in the figure, the convex portion of the C-shaped element is preferably positioned upwardly (facing towards the enclosure 100) while the concave portion of the C-shaped element is position downwardly (facing away from the enclosure 100). As shown herein, the C-shaped element 300 is preferably placed in the central portion of the base 200. The threaded fastener 600 is shown extending through the aperture 1010 in the saddlebag 1000.

Figure 5:
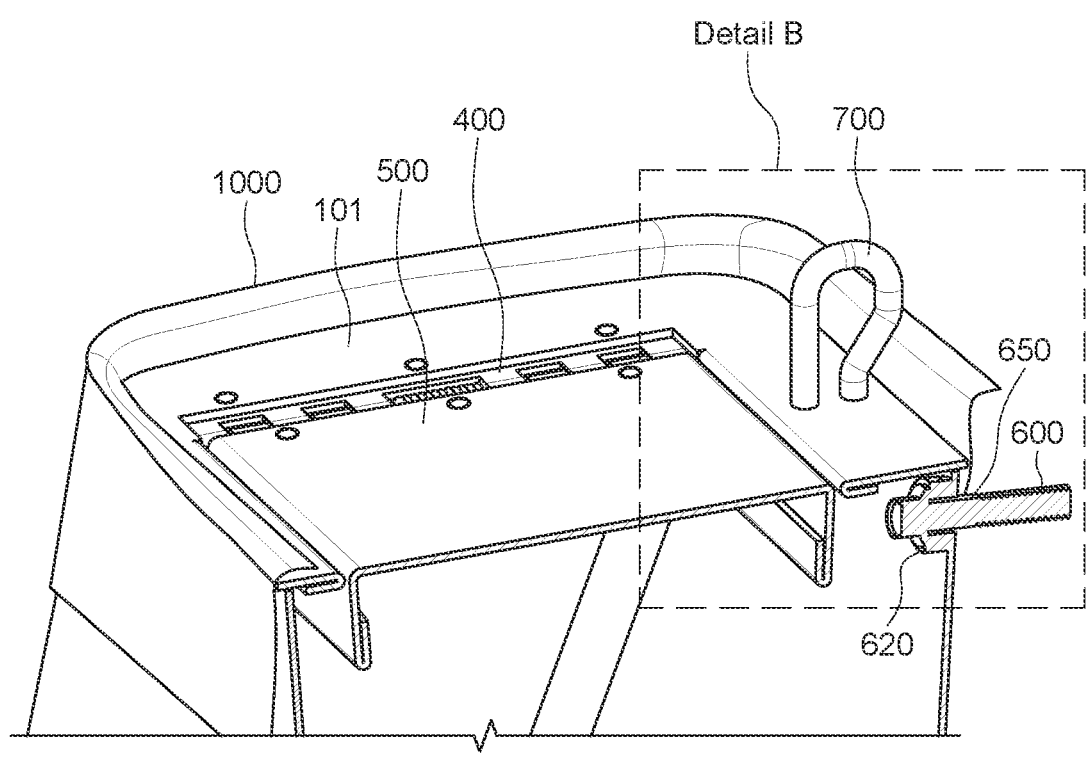
FIG. 5 is a detailed section view of Detail A shown in FIG. 4, also showing the location of Detail B.

FIG. 5 is a detailed section view of Detail A shown in FIG. 4, also showing the location of Detail B. It is preferable that the threaded fastener 600 includes a wing nut 620 or some other object rigidly fastened to the threaded fastener 600 so that a user can easily grasp the fastener 600 and rotate it so that the fastener 600 engages with female threads placed on the motorcycle body/frame (not shown). The fastener 600 also preferably passes through an aperture 650 placed on the sidewall of the enclosure 100. Aperture 650 can be described as a pass-through aperture as it preferably does not contain any threads but is simply an opening in the sidewall of the enclosure 100 (preferably on the same side of the enclosure as the hook 700).

Figure 6:
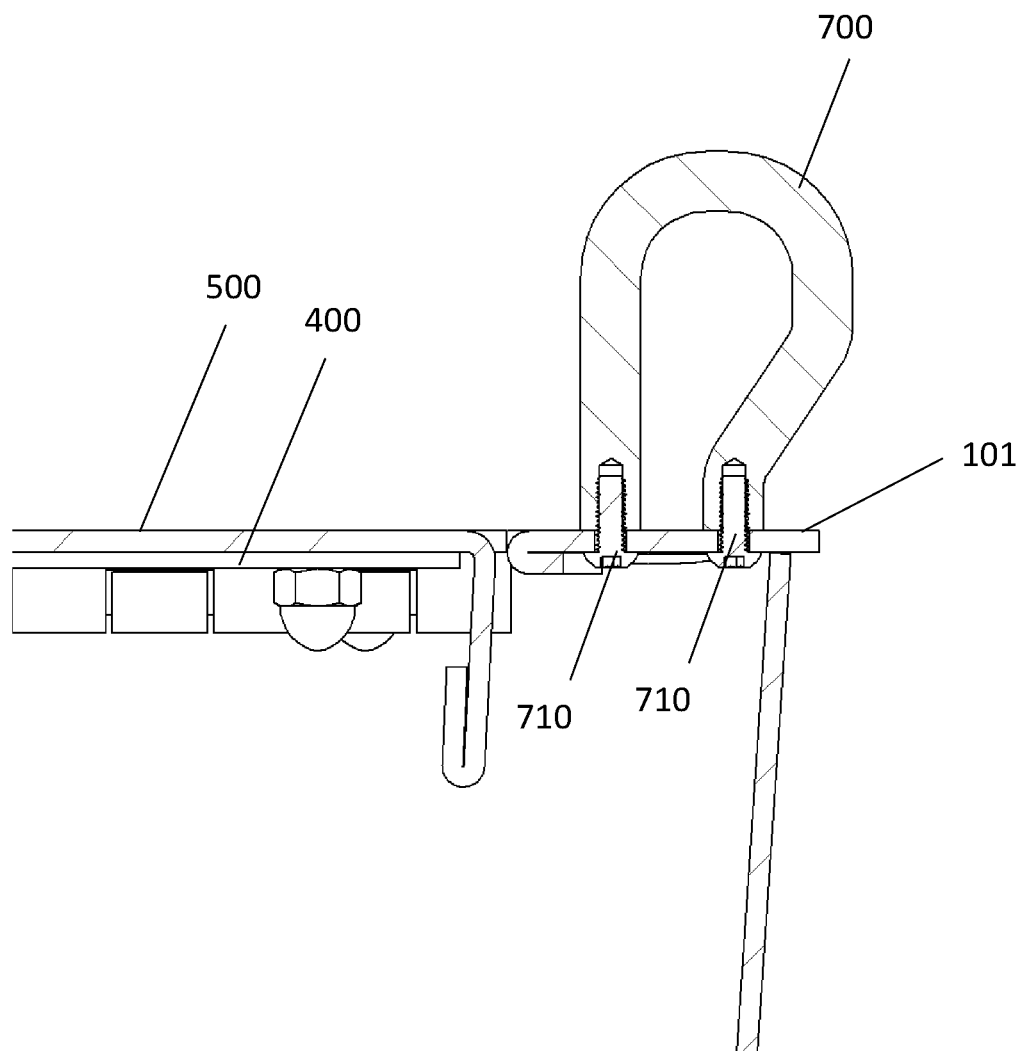
FIG. 6 is a detailed section view of Detail B shown in FIG. 5.

FIG. 6 is a detailed section view of Detail B shown in FIG. 5. The latch or hook 700 is preferably a continuous piece of material having a circular cross section, which is bent in several locations until forming a general U-shape. The hook 700 is preferably attached at two ends to the top panel 101, where the two ends are adjacent to one another. The hook 700 should preferably create a closed loop with the top panel 101. A female threaded hole is preferably tapped into each of the ends of the hook 700, which then receives a threaded fastener 710 from below, so that the fastener 710 moves upwardly from the interior of the enclosure 100 until passing through the top panel 101 of the enclosure 100 and engaging with the female threads in the hook 700. Generally speaking, this method of attaching the hook 700 to the top panel 101 of the enclosure sure be durable enough for normal use but should a prying force be applied to the hook 700 relative to the enclosure 100, the hook 700 and fasteners 710 should be designed to fail, to prevent anyone from using the hook 700 as a prying point for prying open the access door 500.

Figure 7:
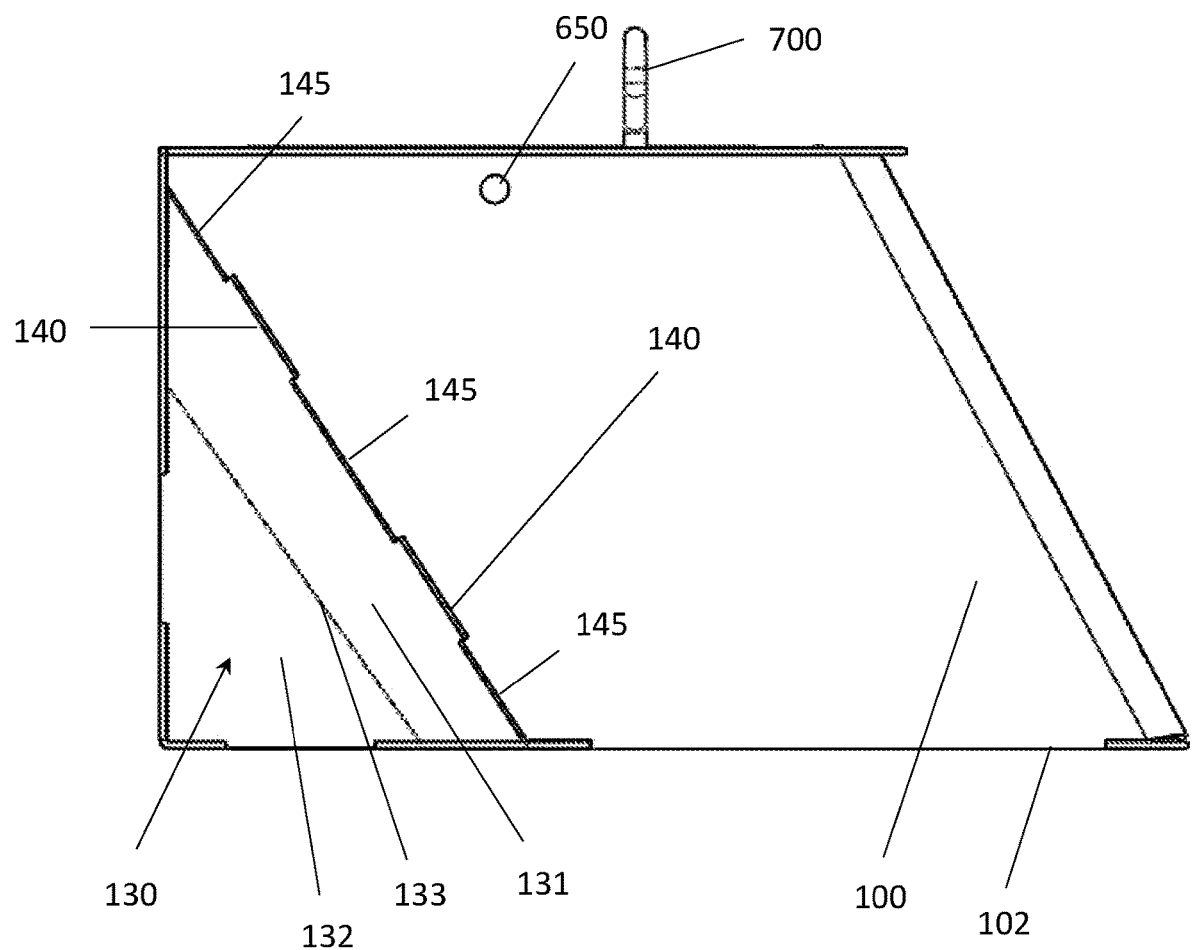
FIG. 7 is a right projection view of an exemplary embodiment of the enclosure and the base, prior to be assembled to the base.
Figure 7:
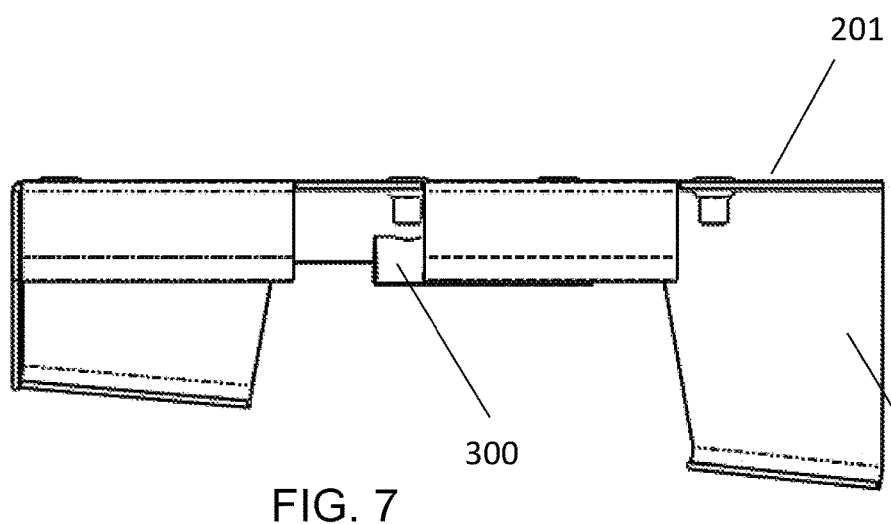

FIG. 7 is a right projection view of an exemplary embodiment of the enclosure 100 and the base 200, prior to be assembled to the base 200. Here you can see a panel assembly 130 on the corner of the enclosure 100 which is essentially comprised of a plate that is bent into two substantially flat portions 131 and 132 along the bending line 133. This panel assembly 130 also preferably includes alternating saw-tooth portions 140/145 which engage with opposing alternating portions on the sidewall of the enclosure 100, so that the panel assembly 130 can mechanically engage for a weld process to bond the panel assembly 130 to the sidewalls of the enclosure 100.

Figure 8:
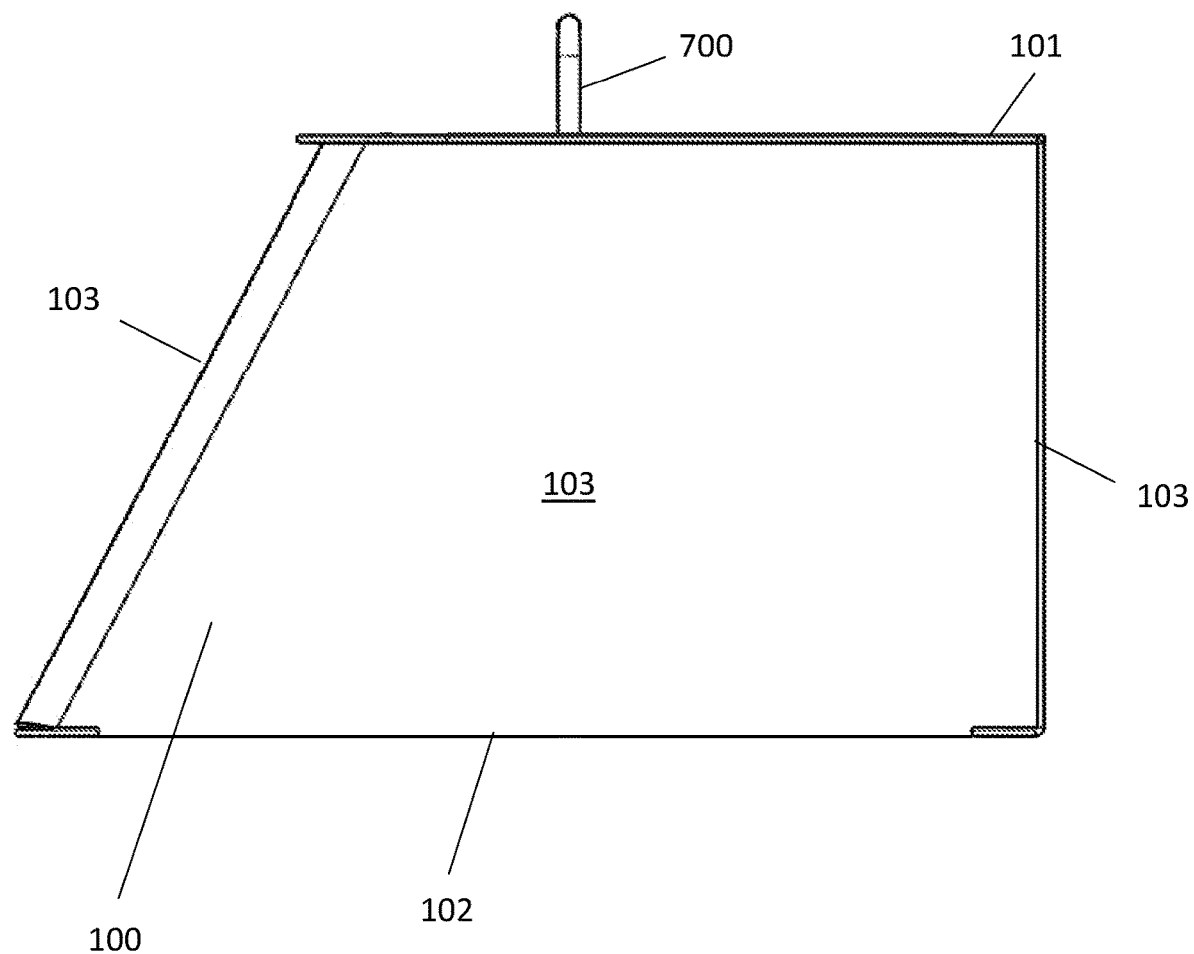
FIG. 8 is a left projection view of an exemplary embodiment of the enclosure and the base, prior to being assembled to the base.
Figure 8:
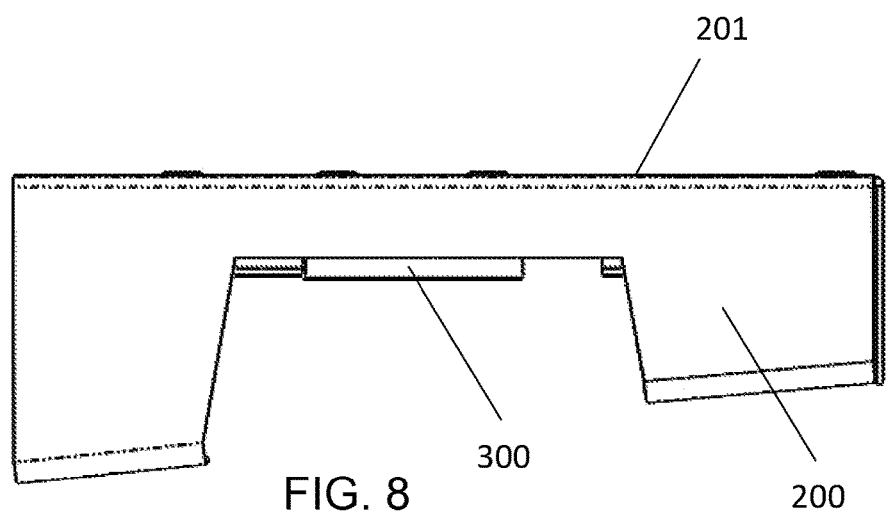

FIG. 8 is a left projection view of an exemplary embodiment of the enclosure 100 and the base 200, prior to assembling the parts together. The base 200 includes a base plate 201 which is preferably substantially flat and should align with the bottom panel 102 of the enclosure 200 when the two are assembled together. Once assembled, the base plate 201 and bottom panel 102 should be parallel and may be in contact with one another.

Figure 9:
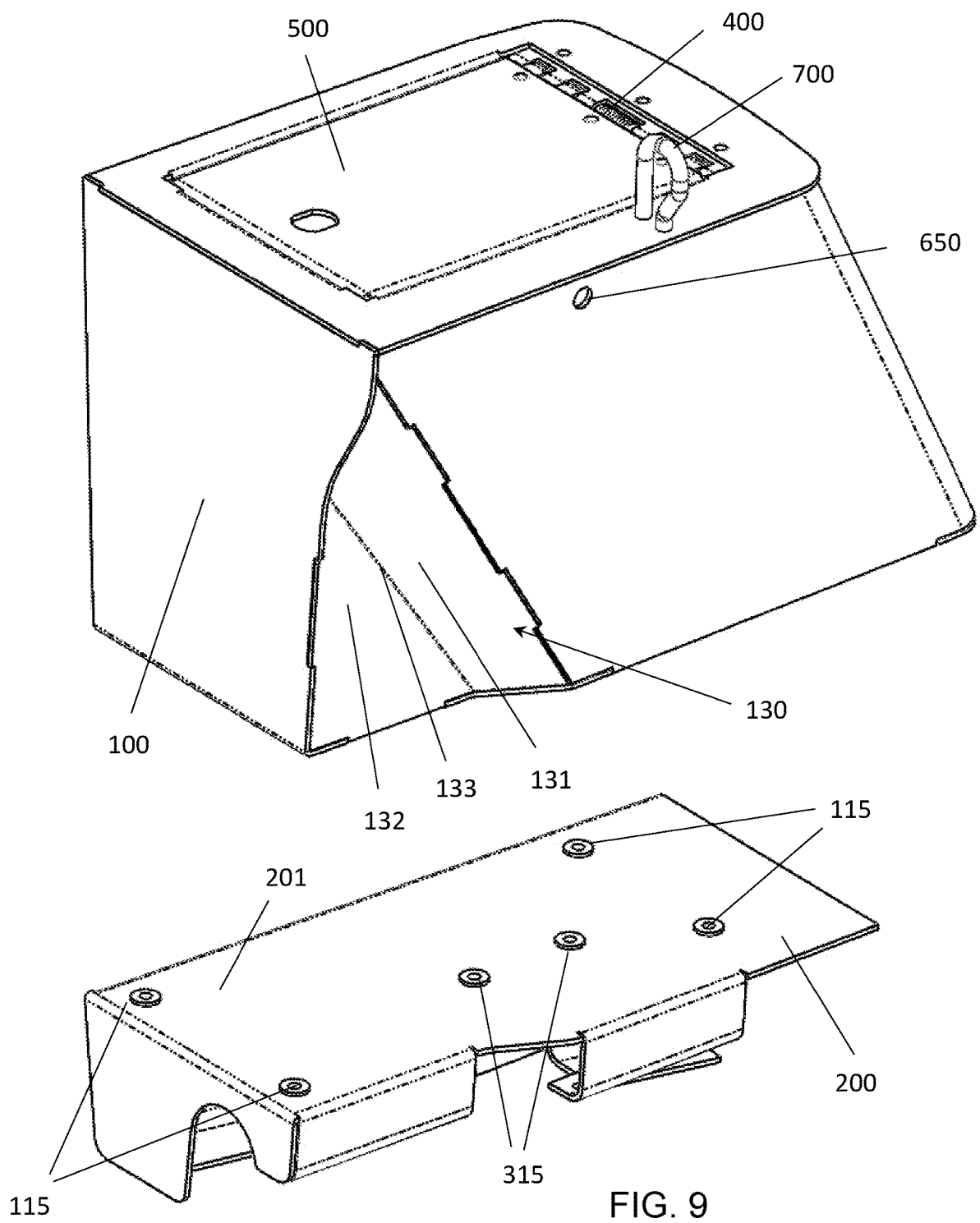
FIG. 9 is a perspective view of the embodiments shown in FIGS. 7-8.

FIG. 9 is a perspective view of the embodiments shown in FIGS. 7-8. Shown here is the aperture 650 which allows the fastener 600 to pass through the sidewall of the enclosure 100. The female threaded members 115 and 315 are preferably attached to the base 200. In an exemplary embodiment the female threaded members 115 and 315 would comprise threaded rivet nuts which would be tac welded onto the base 200, but other female threaded members can be used along with other attachment methods such as adhesive or similar.

Figure 10:
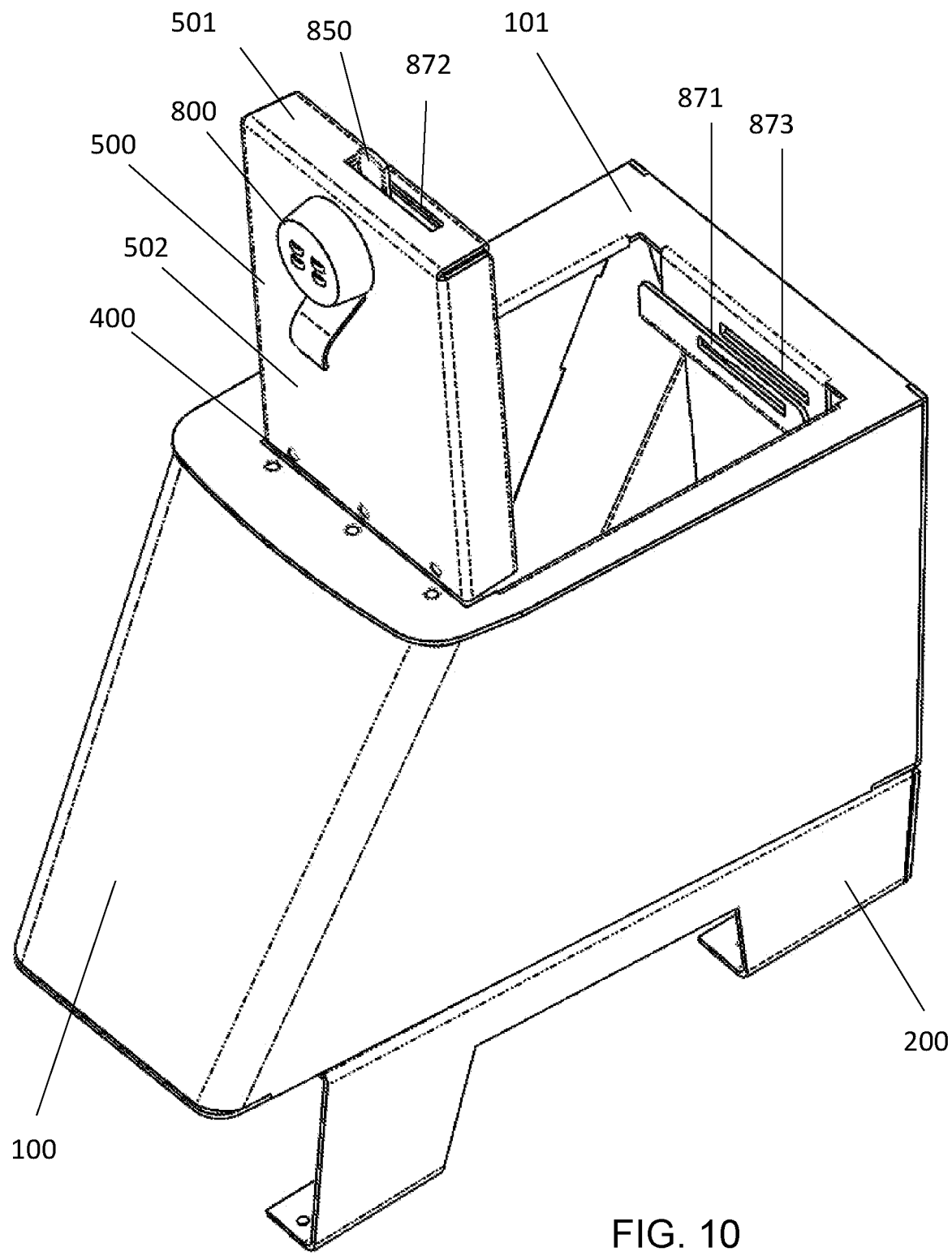
FIG. 10 is a rear perspective illustration of an exemplary embodiment of the enclosure and base where the device has been unlocked and the access door has been opened.

FIG. 10 is a rear perspective illustration of an exemplary embodiment of the enclosure 100 and base 200 where the device has been unlocked and the access door 500 has been opened. The top panel 101 of the enclosure 100 preferably contains a U-shaped channel with a pair of opposing slots 871 and 873 on opposing sides of the U-shape channel. The access door 500 preferably contains a side portion 501 which is generally perpendicular to the top portion 502 of the access door 500. When the access door 500 is closed, the side portion 501 of the access door 500 slides downwardly into this U-shaped channel until the slot 872 in the side portion 501 is adjacent to the slots 871 and 873 so that the locking lever 850 can rotate into the locked position. In the locked position, all three slots are aligned in this order 871, 872, and 873 where the locking lever 850 passes through all three slots 871, 872, and 873. When unlocking the access door 500, the lock 800 (having a mechanical connection to the locking lever 850) would be rotated until the locking lever 850 was free of all three slots. Also as shown, the rear portion of enclosure 100 should extend past (cantilevered) over the edge of the base 200.

Figure 11:
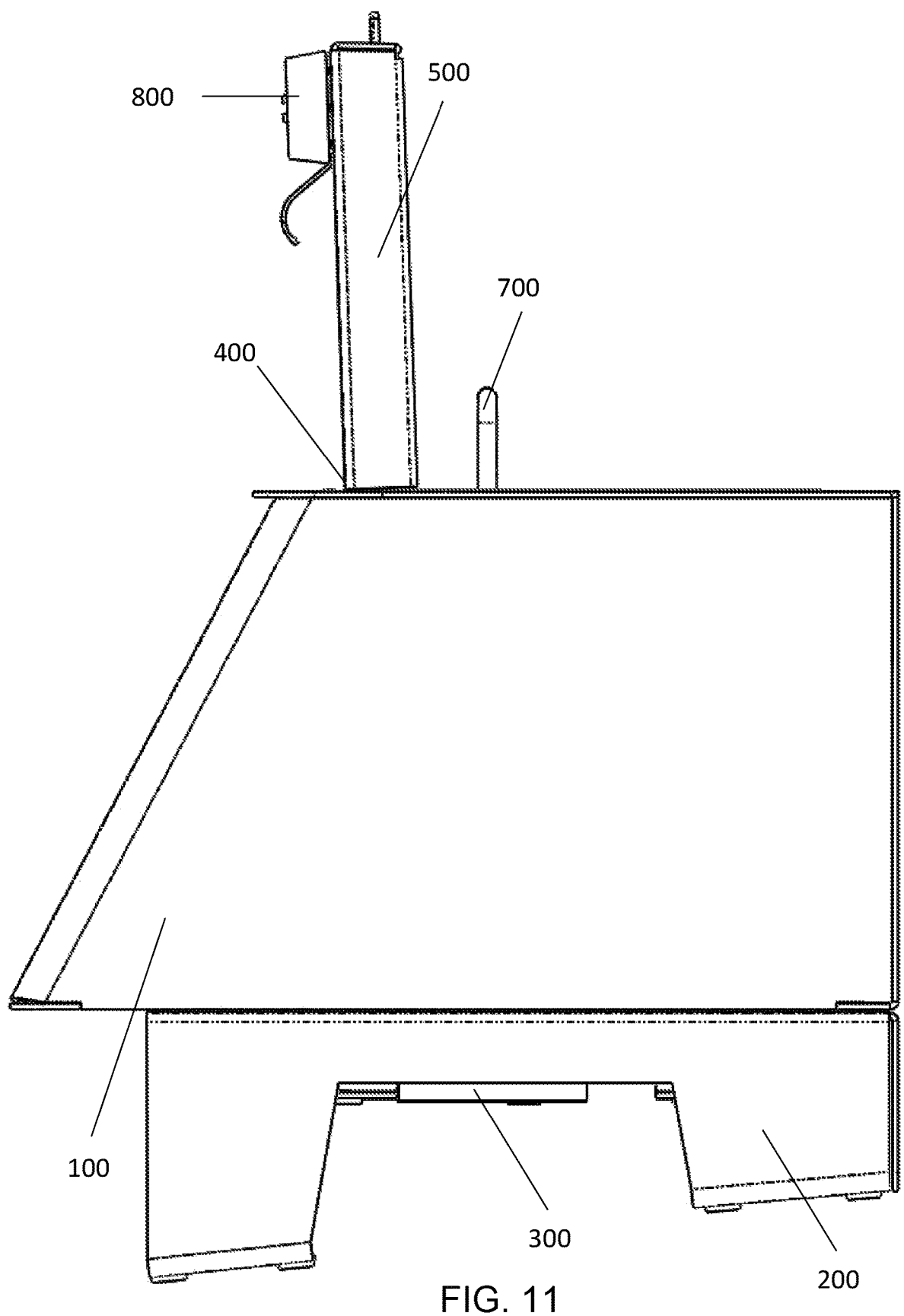
FIG. 11 is a left projection view of an exemplary embodiment of the device where the access door is open.

FIG. 11 is a left projection view of an exemplary embodiment of the device where the access door 500 is open. Preferably, in this position the door 500 is not aligned with the hook 700. Preferably, the door 500 is generally parallel to the hook 700 when the door 500 is fully opened as shown, but not aligned. The access door 500 should preferably reach near vertical as shown, when fully opened.

Figure 12:
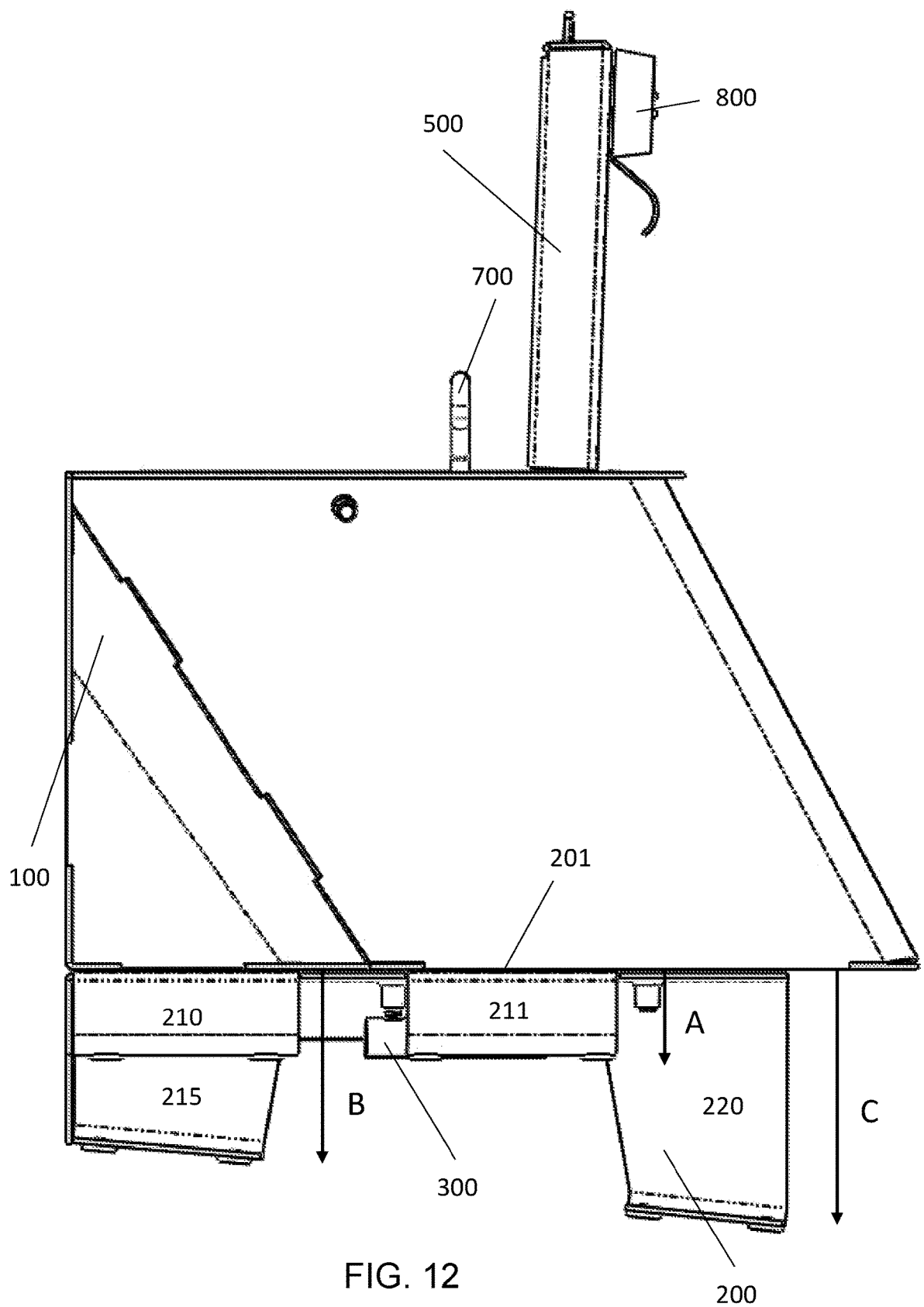
FIG. 12 is a right projection view of an exemplary embodiment of the device where the access door is open.

FIG. 12 is a right projection view of an exemplary embodiment of the device where the access door is open 500. Here the different legs of the base 200 are shown. A first pair of legs 210 and 211 extend substantially the same Distance A below the floor of the enclosure 100. A third leg 215 extends at Distance B below the floor, and a fourth leg 220 extends at distance C below the floor of the enclosure 100. As shown, generally it is preferred if Distance C>Distance B>Distance A. Also note that while the bottom portions of legs 210 and 211 are substantially flat (parallel to the floor of the enclosure 100), the bottom portions of legs 215 and 220 are angled relative to the floor. Thus, for determining Distance B and Distance C, the average or median distance from the floor of the enclosure 100 should be used.

Figure 13:
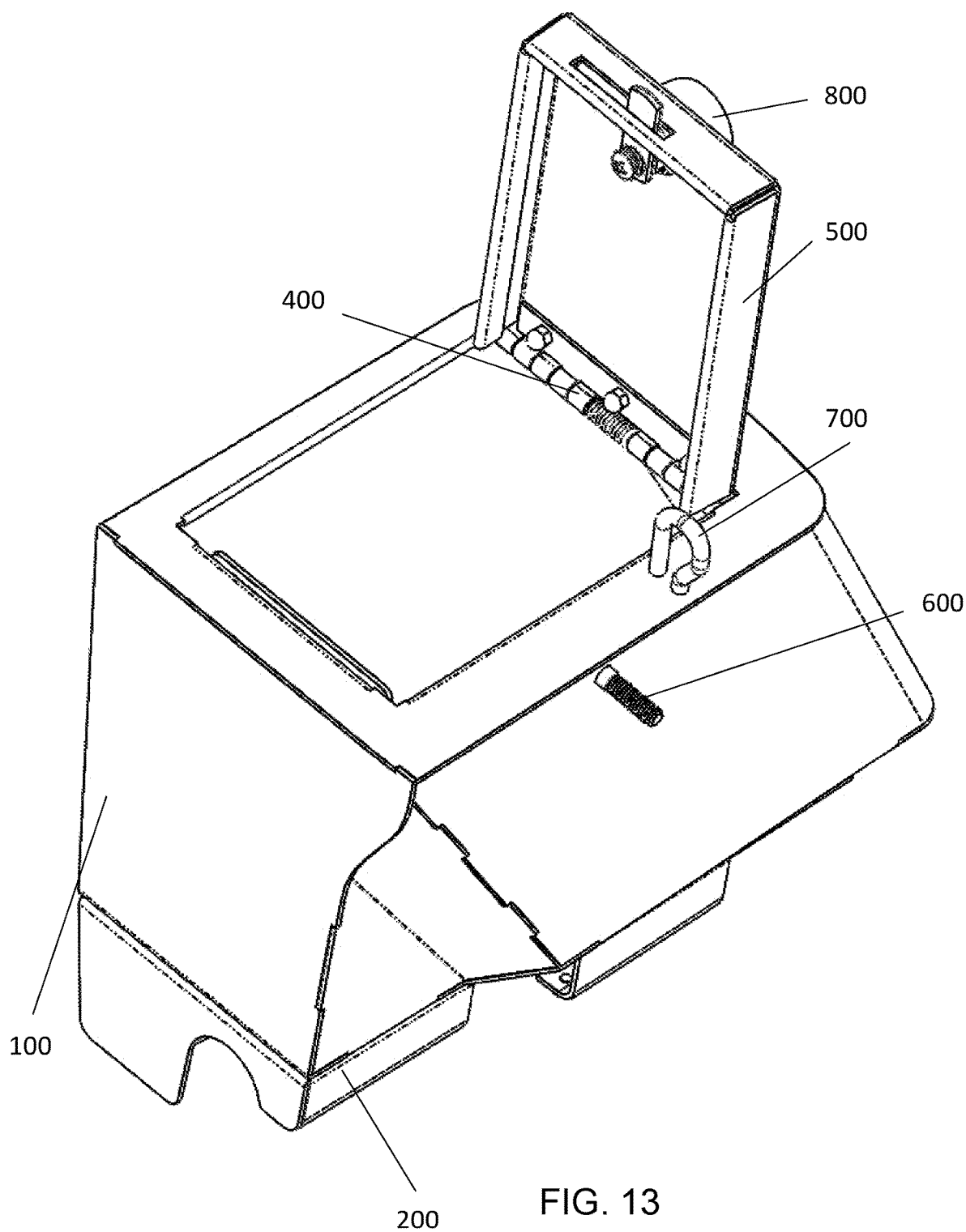
FIG. 13 is a front perspective illustration of an exemplary embodiment of the enclosure and base where the device has been unlocked and the access door has been opened.

FIG. 13 is a front perspective illustration of an exemplary embodiment of the enclosure and base where the device has been unlocked and the access door 50 has been opened.

Figure 14:
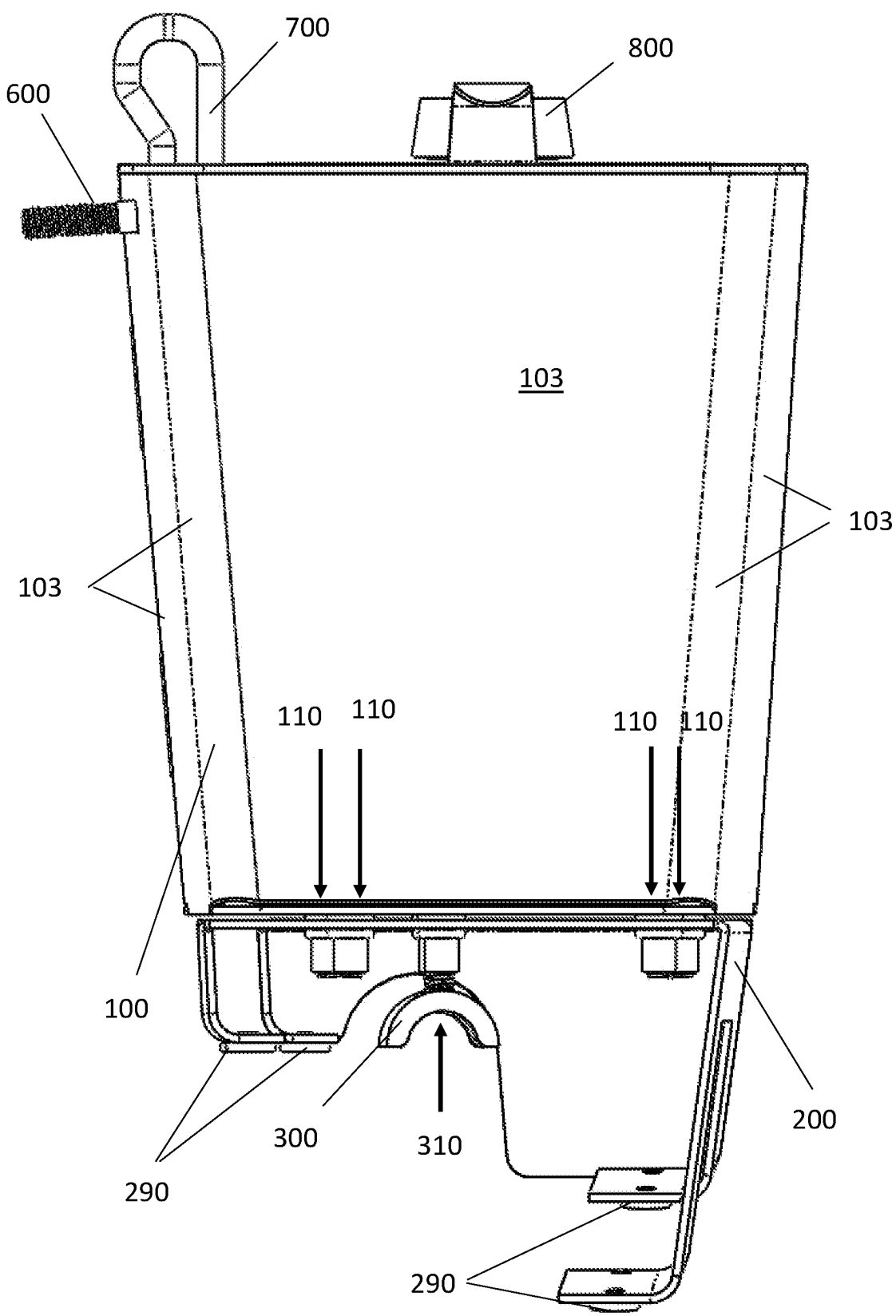
FIG. 14 is a rear projection view of an exemplary embodiment.

FIG. 14 is a rear projection view of an exemplary embodiment. The fasteners 110 preferably come from the top, through the interior of the enclosure 100 to engage with the female threaded members 115. The fastener(s) 310 comes from the bottom, upwardly through the aperture(s) 320 in the C-shaped element 300, engaging with the female threaded member 315. Also shown here are the optional feet 290 that can be attached to the bottom legs of the base 200. The feet 290 are preferably an elastomer or rubber of some type but any soft or adequately compressible material would work in various embodiments.

Figure 15:
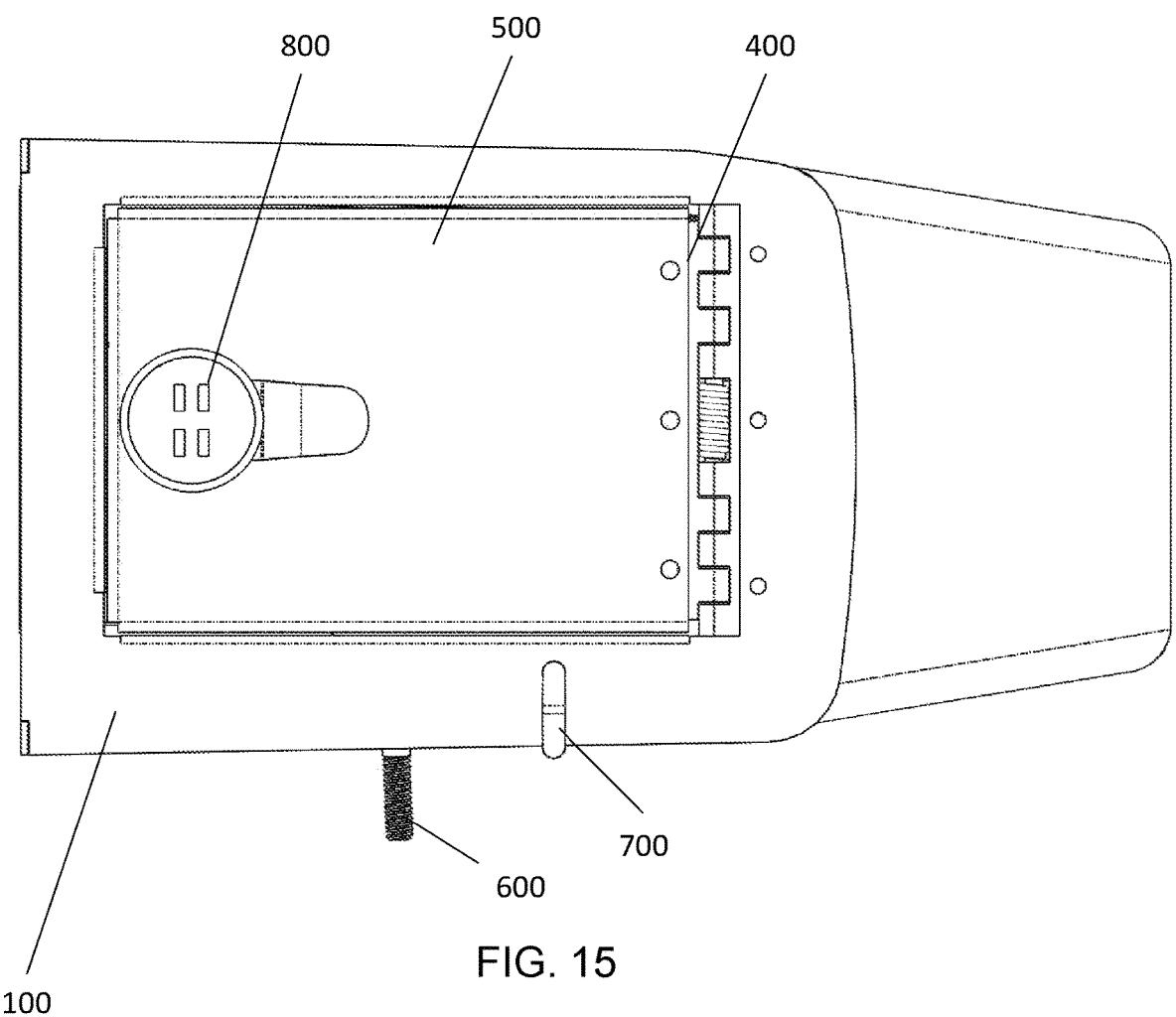
FIG. 15 is a top plan view of an exemplary embodiment.

FIG. 15 is a top plan view of an exemplary embodiment.

Figure 16:
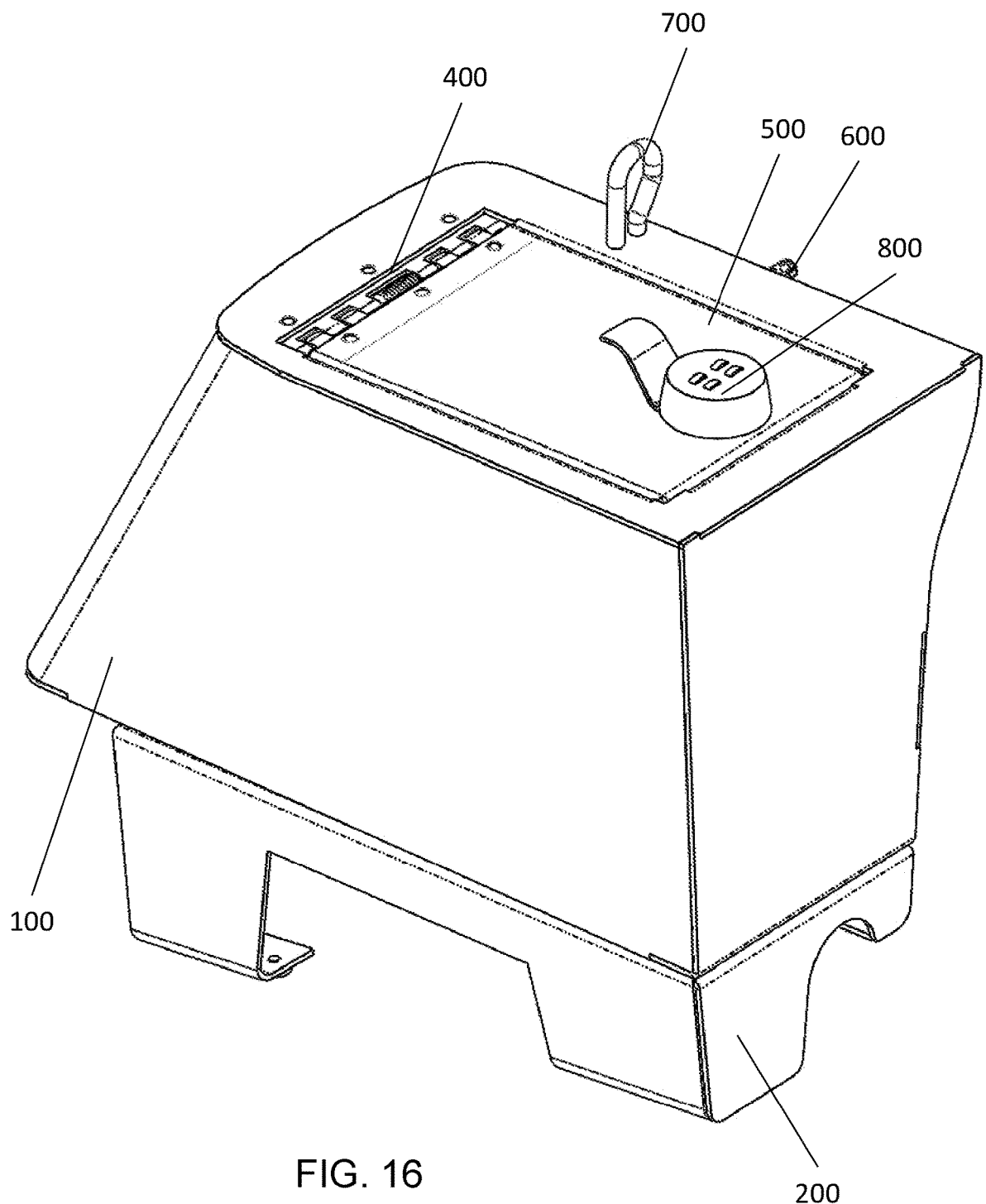
FIG. 16 is a top perspective view of another exemplary embodiment.

FIG. 16 is a top perspective view of another exemplary embodiment.

Figure 17:
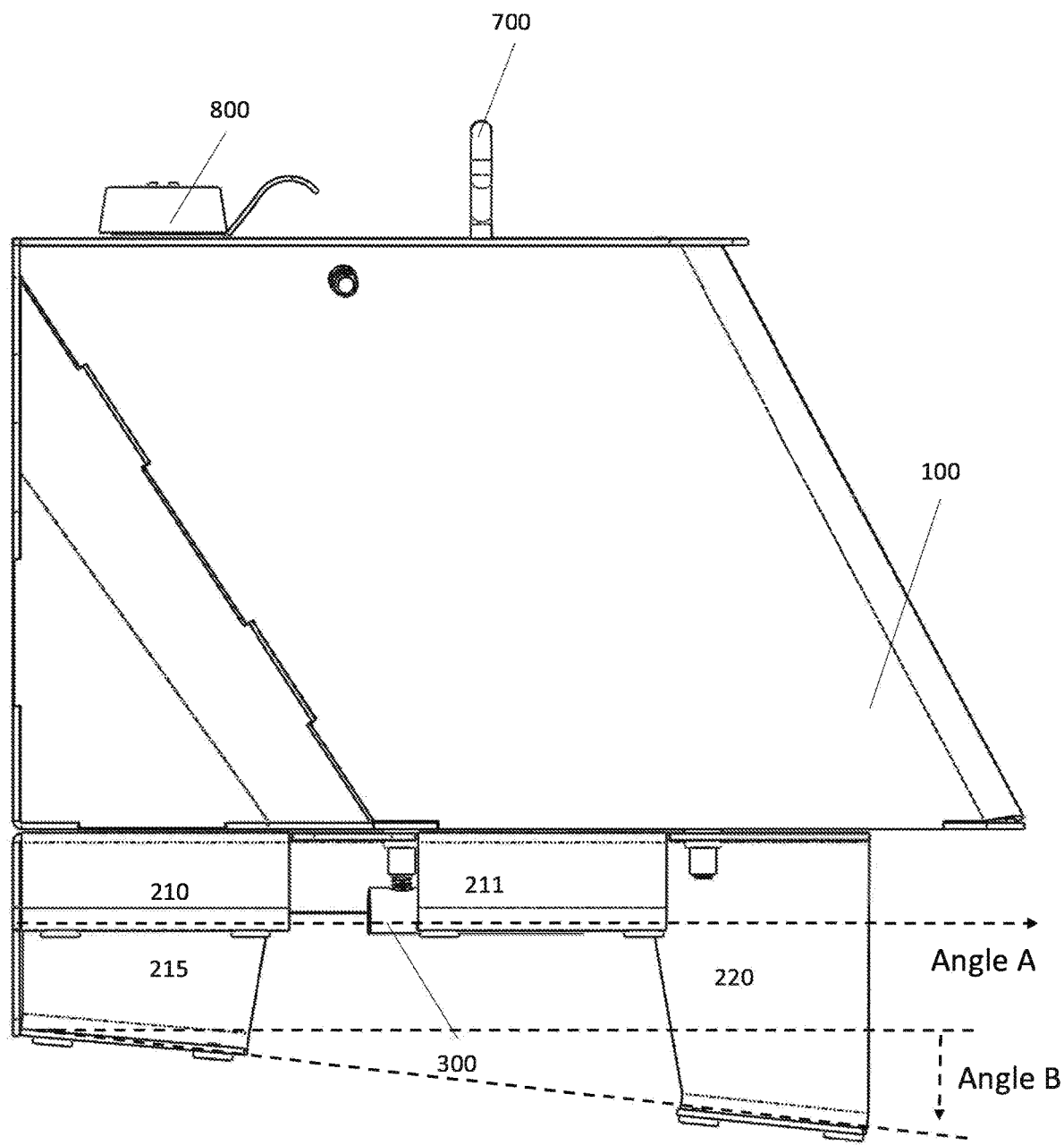
FIG. 17 is a right projection view of an exemplary embodiment of the device showing the positions of the base components relative to the generally horizontal bottom panel of the enclosure.

FIG. 17 is a right projection view of an exemplary embodiment of the device showing the positions of the legs of the base 200 relative to the generally horizontal bottom panel 102 of the enclosure 100. As noted above, while the bottom portions of legs 210 and 211 are substantially flat (parallel to the floor of the enclosure 100), therefore Angle A which is the angle of the bottoms of the legs 210 and 211 relative to the horizontal, is essentially zero, or between −5 degrees and +5 degrees from horizontal. In contrast, the bottom portions of legs 215 and 220 are angled at Angle B relative to the floor of the enclosure 100 (or horizontal generally). In a preferred embodiment, Angle B is between −5 degrees and −10 degrees, but could be anywhere between −2 degrees and −25 degrees in some embodiments. It is further preferable that both feet 215 and 220 share the same angle (here Angle B) relative to the horizontal.

Figure 18:
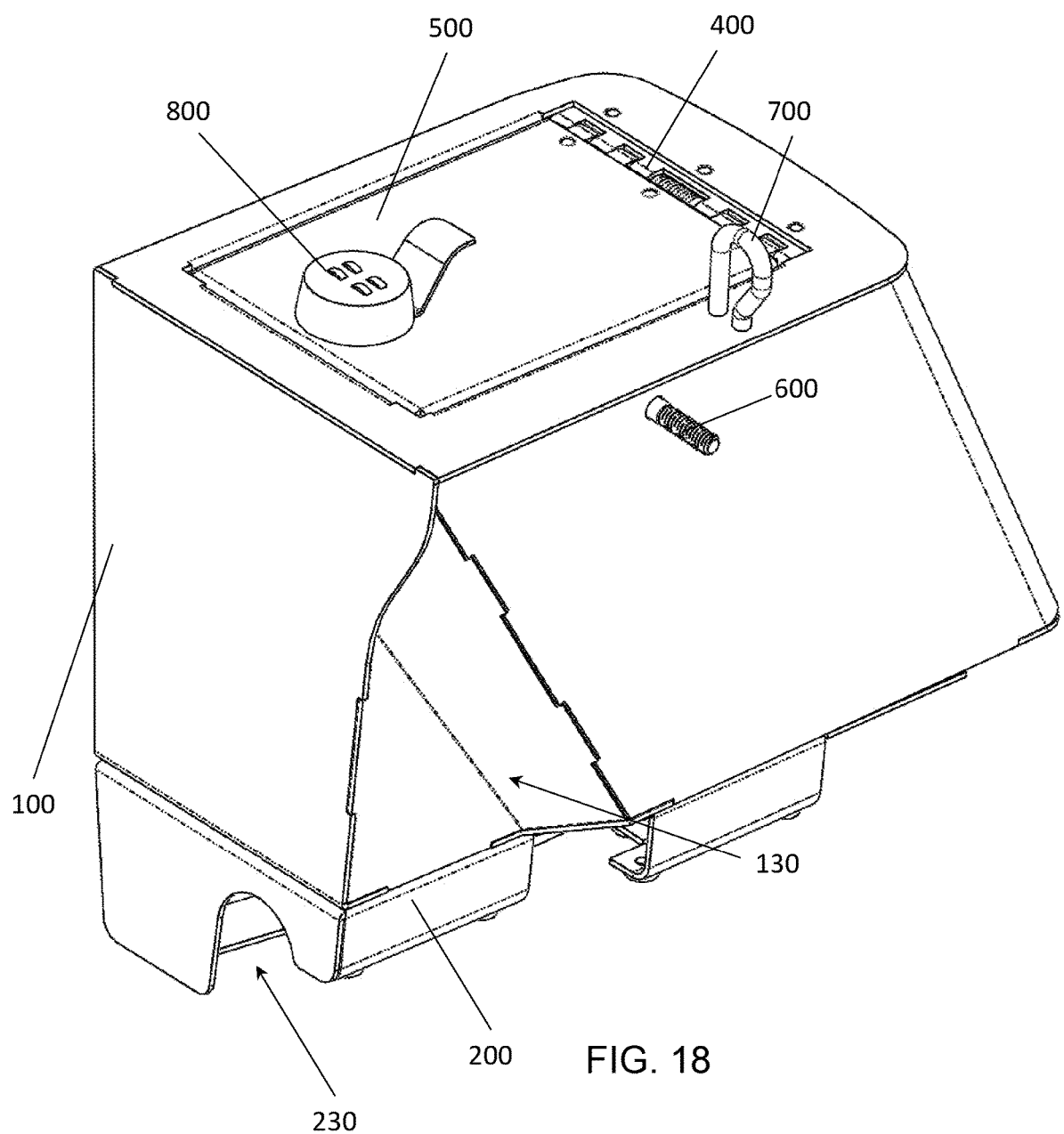
FIG. 18 is a front perspective illustration of an exemplary embodiment of the enclosure and base where the access door has been closed and the device has been locked.

FIG. 18 is a front perspective illustration of an exemplary embodiment of the enclosure 100 and base 200 where the access door 500 has been closed and the device has been locked. Here you can also see the rounded void 230 in one end of the base 200 while the opposing end of the base 200 is generally open with no sidewall.

Figure 19:
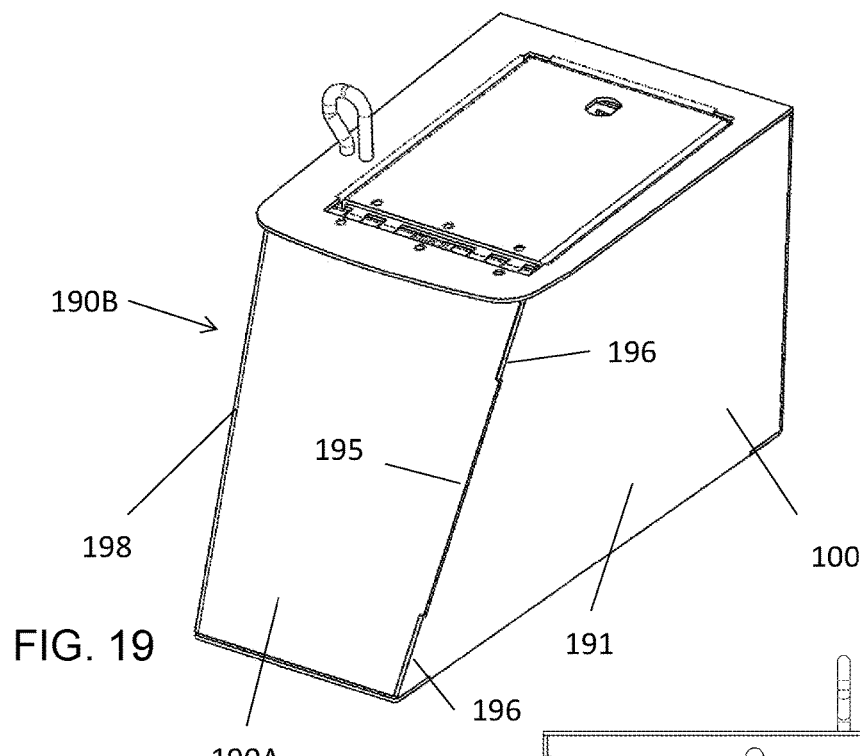
FIG. 19 is a rear perspective illustration of a preferred exemplary embodiment of the enclosure.

FIG. 19 is a rear perspective illustration of a preferred exemplary embodiment of the enclosure 100. In this embodiment, the rear of the device is comprised of a continuous panel comprising a front portion 190A and a side portion 190B with a radius 198 placed between the two portions 190A/190B. Front portion 190A should be substantially flat and positioned in a plane that is substantially perpendicular to the plane of side portion 190B (which should also preferably be substantially flat). The radius 198 preferably extends across the entire edge of panel 190 and preferably has the same bend radius across the entire length of panel 190 between portions 190A/190B.

An alternating saw-tooth edge 195/196 is preferably located on the opposing side of the front portion 190A as the radius 198. Preferably, alternating saw-tooth portions 195/196 engage with opposing alternating portions on the sidewall panel 191 of the enclosure 100, so that the panel 190 can mechanically engage with the sidewall panel 191 for a weld process to bond the two pieces together.

Figure 20:
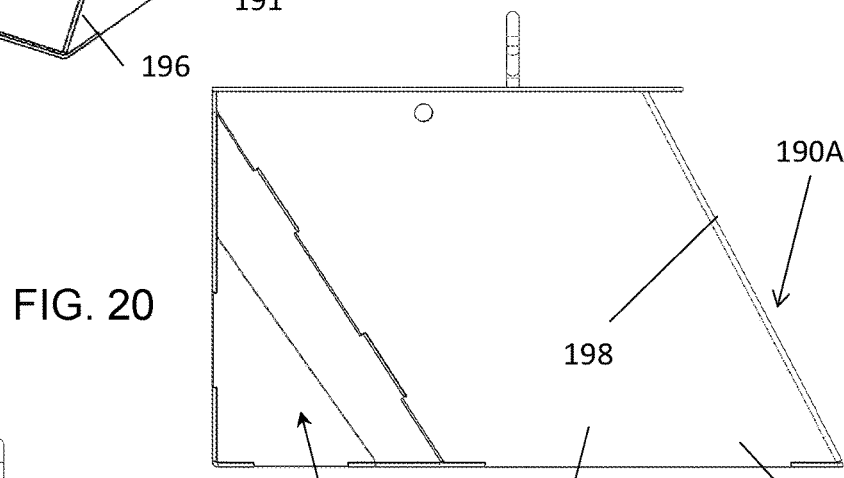
FIG. 20 is a right projection view of the embodiment shown in FIG. 19.

FIG. 20 is a right projection view of the embodiment shown in FIG. 19. Here, the same rear panel 190 has been bent at the radius 198 to create a continuous sheet that provides both a rear wall and sidewall of the enclosure 100 in the form of a front portion 190A and a side portion 190B.

Figure 21:
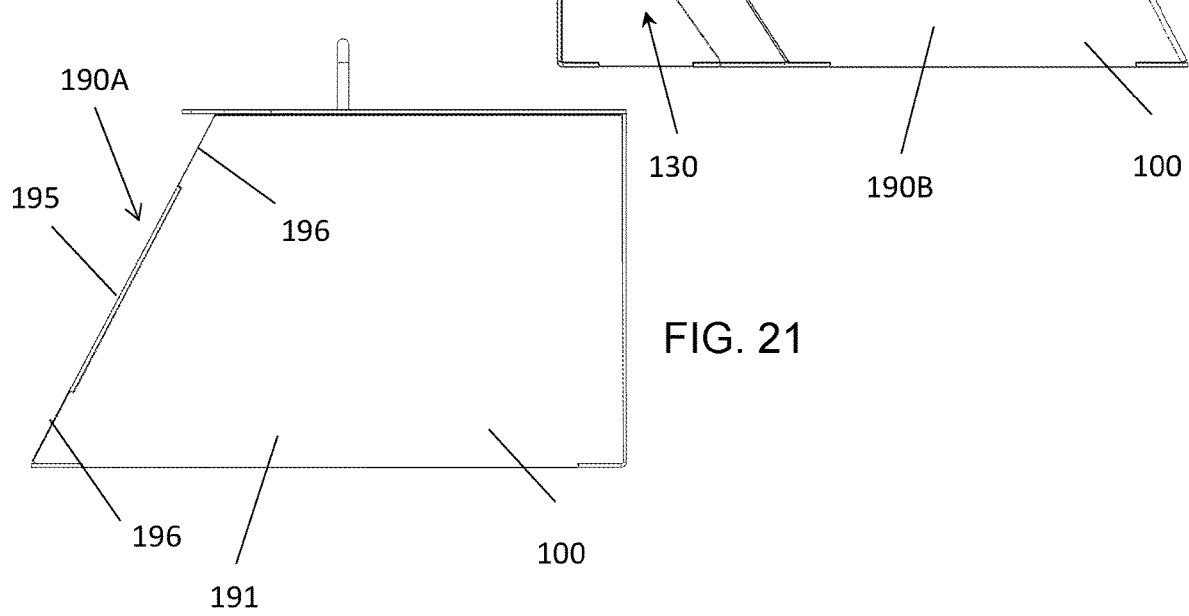
FIG. 21 is a left projection view of the embodiment shown in FIG. 19.

FIG. 21 is a left projection view of the embodiment shown in FIG. 19. Here we can see the alternating saw tooth portions 195/196 used to attach the panel 190 to the sidewall panel 191.

The particular combination of features shown herein has surprisingly shown a number of advantages in manufacturing, assembly time, unit cost, and end-use strength.

The majority of the components herein are preferably metallic or comprised substantially of metal, specifically the enclosure 100, base 200, access door 500, panel assembly 130, hook 700, and hinge 400. Some embodiments could utilize plastics or composite materials as an alternative, depending on the application and the target cost for the device.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

We claim:

1. A motorcycle saddlebag security enclosure assembly comprising:
   an enclosure having
      a substantially flat top panel,
      an access door substantially parallel to the top panel,
      a bottom panel positioned below the top panel, and
      a plurality of side panels which connect between the top panel and bottom panel; and
   a hook extending upwardly from the top panel which attaches at two end points to the top panel; and
   an aperture in one of the side panels and positioned on the same side of the enclosure as the hook.

2. The security enclosure assembly of claim 1 further comprising a base adapted for removable attachment to the enclosure and having:
   a substantially flat base plate, and
   a plurality of legs extending downwardly from the base plate.

3. The security enclosure assembly of claim 1 further comprising:
   a female threaded hole placed in each of the two end points of the hook, and
   a pair of threaded fasteners extending upwardly from the interior of the enclosure, passing through the top panel and engaging with the female threaded holes.

4. The security enclosure assembly of claim 1 wherein the side panels comprise a front portion and side portion defined by a single panel with a bend radius separating the front portion from the side portion.

5. The security enclosure assembly of claim 1 wherein two legs extend distance A from the base plate, a third extends distance B, and a fourth leg extends distance C, where A<B<C.

6. The security enclosure assembly of claim 1 further comprising:
   a plurality of female threaded nuts below the base; and
   a plurality of male threaded fasteners passing downwardly through the bottom panel and engaging with the nuts.

7. The security enclosure assembly of claim 1 further comprising a C-shaped base element positioned below the base.

8. The security enclosure assembly of claim 7 wherein the C-shaped base element is positioned with a convex portion facing upwardly and towards the enclosure and an opposing concave portion facing downwardly and away from the enclosure.

9. The security enclosure assembly of claim 1 wherein the hook has a circular cross-section.

10. The security enclosure assembly of claim 1 further comprising a u-shaped channel having a concave portion attached to the top panel and positioned so that the concave portion faces upwardly.

11. The security enclosure assembly of claim 10 wherein the access door contains a side portion which sits within the u-shaped channel when the access door is in a closed position.

12. The security enclosure assembly of claim 11 further comprising:
    a first slot on a first side of the u-shaped channel;
    a second slot on the side portion of the access door;
    a third slot on the opposite side of the u-channel as the first slot; and
    a locking bar which passes through the first, second, and third slots when placed in a locked position.

13. A motorcycle saddlebag security enclosure assembly comprising:
    an enclosure having
       a substantially flat top panel,
       a u-shaped channel extending down from the top panel and having a first slot on a first side of the channel and a second slot an opposing side of the channel,
       an access door having a top portion which is substantially parallel to the top panel and a side portion which is substantially perpendicular to the top portion,
       a third slot positioned on the side portion of the access door,
       a bottom panel positioned below the top panel, and
       a plurality of side panels which connect between the top panel and bottom panel; and
    a lock assembly in mechanical connection with a locking bar which passes through the first, second, and third slots when in the locked position.

14. The security enclosure assembly of claim 13 further comprising a panel assembly forming a corner of the enclosure and having a single panel bent along a bending line and a saw-tooth edge along an edge of the panel assembly.

15. The security enclosure assembly of claim 13 further comprising a base adapted for removable attachment to the enclosure and having:
    a substantially flat base plate, and
    a plurality of legs extending downwardly from the base plate.

16. The security enclosure assembly of claim 15 further comprising a C-shaped base element adapted to attach to a central portion of the base.

17. The security enclosure assembly of claim 16 further comprising:
    a pass-through aperture placed on a first side of the enclosure; and
    a hook extending upwardly from the top panel and positioned adjacent to the first side of the enclosure.

18. A motorcycle saddlebag security enclosure assembly comprising:
    an enclosure having
       a substantially flat top panel,
       an access door substantially parallel to the top panel,
       a bottom panel positioned below the top panel, and a plurality of side panels which connect between the top panel and bottom panel;

a hook extending upwardly from the top panel; and a pass-through aperture positioned in the sidewall of the enclosure which is adjacent to the hook, so that the aperture is below the hook.

19. The security enclosure assembly of claim 18 further comprising:
    a base adapted for removable attachment to the enclosure and having
        a substantially flat base plate, and
        a plurality of legs extending downwardly from the base plate; and
    a C-shaped base element adapted to connect under the base such that a convex portion of the element is facing upwardly and towards the enclosure while a concave portion is facing downwardly and away from the enclosure.

20. The security enclosure assembly of claim 18 wherein a portion of the enclosure is cantilevered over an edge of the base.

* * * * *